Jan. 12, 1954     H. G. McGRATH     2,666,077
PROCESS FOR HYDROGENATION OF CARBON MONOXIDE
Filed Jan. 31, 1948
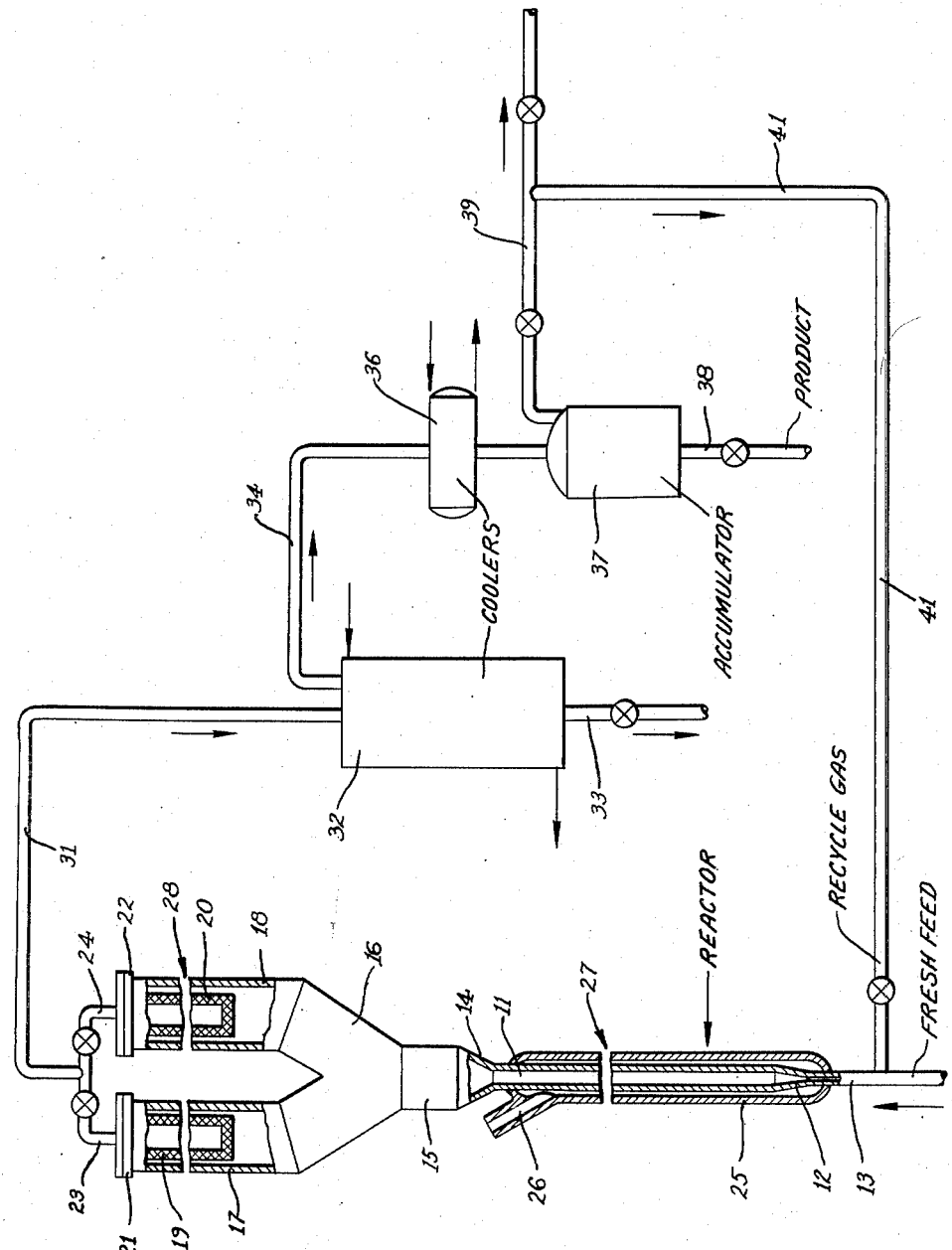
INVENTOR.
HENRY G. MCGRATH
BY E. F. Siebrecht
Cruzan Alexander
His Attorneys Patented Jan. 12, 1954

2,666,077

UNITED STATES PATENT OFFICE 2,666,077

PROCESS FOR HYDROGENATION OF CARBON MONOXIDE

Henry G. McGrath, Elizabeth, N. J., assignor to The M. W. Kellogg Company, Jersey City, N. J., a corporation of Delaware Application January 31, 1948, Serial No. 5,572

10 Claims. (Cl. 260—449.6)

This invention relates to the synthesis of organic compounds. In one aspect this invention relates to the hydrogenation of carbon monoxide in the presence of a metal hydrogenation catalyst to produce hydrocarbons and oxygenated organic compounds. In another aspect this invention relates to the starting-up procedure for the hydrogenation of carbon monoxide in the presence of a catalyst comprising iron. The present process is applicable also in reacting hydrogen with other organic compounds containing the carbonyl group and herein designated as "carbon oxides," such as carbone dioxide, ketones, aldehydes, acyl halides, organic acids and their salts and esters, acid aldehydes, and amines. In the following description of the invention, the hydrogenation of carbon monoxide will be referred to specifically. It will be understood, however, that the invention is of wider application including in its scope the hydrogenation of any suitable carbon oxide or mixtures thereof.

This invention is a continuation-in-part of my prior and co-pending application Serial No. 783,382, filed October 31, 1947, now Patent No. 2,542,422, which application relates to the activation of a fluidized suspended hydrogenation catalyst by a different method than the present method of activation.

Iron, as well as other metals or metal oxides, of group VIII of the periodic table, has been used as a catalyst for the hydrogenation of carbon monoxide. A suitable metallic iron catalyst can be prepared by various methods, such as by the reduction of a ferruginous percipitate, a synthetic iron oxide or a naturally occurring magnetite to elementary iron with or without prior sintering or fusion of the ferruginous material. A cheap iron catalyst is that obtained by fusing Alan Wood ore and the subsequent reduction of the fused material. The method of preparation of an iron catalyst from Alan Wood ore is described in detail in my prior and co-pending application Serial No. 735,536, filed March 18, 1947, now Patent No. 2,543,327. It has been found, however, that, although these catalysts are capable of high activity and the production of relatively large quantities of normally liquid organic compounds including hydrocarbons and oxygenated compounds by the hydrogenation of carbon monoxide, in almost all instances the freshly reduced iron catalyst is substantially inactive for producing normally liquid products and is further characterized by being difficult to fluidize at operating conditions when used in finely divided form. The freshly reduced metal catalyst produces only a relatively small quantity of normally liquid organic compounds such as hydrocarbons, that quantity often being substantially less than about 25 or 30 ccs. per cubic meter of fresh feed, and the fresh catalyst exhibits a carbon monoxide conversion of less than about 45 per cent. Furthermore, after a short period of operation the finely divided iron catalyst often tends to agglomerate and, when the catalyst is fluidized by suspending in a gas to form a so-called pseudo-liquid dense phase, the dense phase settles or becomes deaerated. A settled or deareated condition, regardless of the reason for settling, is characterized by channeling and "rat holing" of the reactant gases through the catalyst mass. According to this invention, it has been found that such freshly reduced catalyst must be activated or pretreated in a particular manner hereinafter described in order to achieve maximum activity and stability of the catalyst for the production of normally liquid organic compounds without excessive formation of wax and relatively high-boiling organic compounds, and in order to prevent agglomeration and sticking of the fluidized catalyst particles.

It is an object of this invention to provide an improved process for the production of organic compounds by the hydrogenation of carbon oxides.

It is still another object of this invention to increase the yield of normally liquid organic compounds by the hydrogenation of carbon monoxide in the presence of a finely divided iron catalyst without excessive formation of waxes and relatively high-boiling organic compounds.

A further object of this invention is to provide a method for preventing the agglomeration and sticking of an iron catalyst used in the finely divided form for the hydrogenation of a carbon oxide to produce organic compounds.

Another object of this invention is to provide a method for starting-up or initiating the reaction between hydrogen and carbon monoxide in the presence of a freshly reduced or prepared iron catalyst.

Another object of this invention is to provide a method for assuring continuous operation of the hydrogenation of carbon monoxide in the presence of a fluidized iron catalyst.

Yet another object is to provide a method for rendering an iron catalyst susceptible to severe operating conditions without danger of loss of fluidity of the catalyst.

A further object is to provide a method for the prevention of settling of the catalyst bed in the hydrogenation of carbon monoxide by the fluid-bed technique.

Various other objects and advantages of the present invention will become apparent to those skilled in the art from the accompanying description and disclosure.

I have found that a freshly prepared or freshly reduced catalyst comprising iron, such as that prepared by the fusion of a naturally occurring magnetite and the subsequent reduction of the fused material to elementary iron, is relatively inactive as the catalyst for the hydrogenation of carbon oxides to produce normally liquid organic compounds and, when used in a fluidized condition, the catalyst has the tendency to lose its fluidity, such as by agglomerating, sticking, channeling, etc. I have further found that the catalyst can be maintained at a high activity and in a state of continuous fluidization during the hydrogenation process by pretreating or activating the freshly reduced or freshly prepared catalyst material in accordance with the teachings of this invention. Accordingly, the freshly reduced or freshly prepared iron catalyst is initially contacted with a gaseous mixture comprising a relatively low concentration of carbon monoxide and a relatively high concentration of hydrogen for a period of time such that the catalyst obtains a high activity for the optimum production of normally liquid organic compounds and retains its fluidized condition without agglomerating or sticking throughout the hydrogenation process. The gaseous mixture used for pretreating the catalyst contains hydrogen and less than about 15 volume per cent, preferably between about 5 and about 10 volume per cent, carbon monoxide in a mol ratio of hydrogen to carbon monoxide of at least about 5:1, preferably 6:1 or higher. The fresh catalyst is first contacted with such a gaseous mixture of hydrogen and carbon monoxide for a period of time equivalent to at least 150 and preferably at least 300 standard cubic feet of carbon monoxide per pound of catalyst calculated as an elementary metal. Thereafter, after the catalyst has been fully activated and its tendency to agglomerate minimized, the feed composition may be altered to correspond to the desired inlet feed composition of the hydrogenation process proper for the production of normally liquid organic compounds. Such inlet feed composition for the hydrogenation proper is generally a mol ratio of hydrogen to carbon monoxide between about 1:1 and about 10:1, or higher, usually the feed ratio is about 2:1 to about 5:1. A particular advantage of the present activation or pretreating process which has not been found with other activating and pretreating processes, such as the activation process of my co-pending application, Serial No. 783,382, now Patent No. 2,542,422, is the fact that the normal operating conditions may be established immediately upon contact with the gaseous mixture containing carbon monoxide, i. e., during the activating or pretreating period. Thus, the desired operating temperatures, pressures and space velocities may be employed for both the activation period and the hydrogenation proper.

In many instances, the gaseous mixture of hydrogen and carbon monoxide will contain carbon dioxide as a by-product of the gas making process and it is desirable, therefore, to assure excess hydrogen in the gaseous mixture over that amount required to react with carbon monoxide and with carbon dioxide, such as by the water gas shift reaction. During activation of the catalyst, the mol ratio of hydrogen to carbon monoxide and carbon dioxide should be at least 5:1.

As an illustration of the process of the present invention including the activation treatment, a freshly reduced iron catalyst in finely divided form is removed from a reduction chamber in the presence of an inert gas, such as nitrogen or carbon dioxide, and placed in the synthesis reaction chamber. The catalyst and reaction chamber is heated to the desired operating temperature, such as between about 590° F. and about 610° F. or higher, by conventional means known to those skilled in the art, such as by passing an inert gas at a relatively high temperature through the catalyst mass or by indirect heat exchange. A pressure of about 250 pounds per square inch gage or higher and a space velocity substantially above 200 standard volumes of gas per volume of catalyst in the synthesis reactor may be employed upon initial contact with carbon monoxide. The treating gas of the composition of about 5 volume per cent carbon monoxide, about 30 per cent hydrogen, a small amount of carbon dioxide, and the remainder inert gases, such as methane and nitrogen is passed through the contact mass of finely divided catalyst particles at a linear velocity sufficient to suspend the mass in a fluidized condition. It is preferable to gradually increase the carbon monoxide content of the inlet gas during the activation treatment to the ultimately desired operating value. After the pretreatment period, the gaseous mixture of hydrogen and carbon monoxide may be changed, for example, to a composition equivalent to about 25 per cent carbon monoxide, about 65 per cent hydrogen, and the remainder methane, nitrogen and carbon dioxide. At the established operating conditions with such a gaseous mixture, a relatively high yield of normally liquid organic compounds is produced. Such yields are approximately 100 c. c. per cubic meter of fresh feed and about 120 c. c. per cubic meter of fresh feed of normally liquid organic compounds and water, respectively.

When the catalyst contains a relatively high alkali content (above about 0.8 per cent of an alkali metal or an alkaline earth calculated as the oxide), the amount of gas of low carbon monoxide concentration contacted with the fresh catalyst is preferably greater than about 250 standard cubic feed of carbon monoxide per each pound of catalyst in the reaction zone. For a more detailed description of the composition of high and low alkali catalysts, reference may be had to my prior and co-pending application Serial No. 725,835, filed February 1, 1947, now Patent No. 2,593,647.

According to this invention, a gaseous mixture comprising hydrogen and a carbon oxide is passed through a reaction zone in contact with a suspended mass of the finely divided iron catalyst during the pretreatment or activation of the catalyst and the hydrogenation process proper. The gaseous mixture of reactants and reaction products is passed through the mass of finely divided catalyst at a linear gas velocity sufficient to suspend or entrain the catalyst mass in the gas stream. Generally, the gas stream is passed upward through the reaction zone at a linear velocity sufficiently low to maintain the catalyst in a dense fluidized pseudo-liquid condition. However, the velocity may be sufficiently high to entrain all or a substantial proportion of the finely divided catalyst in the gas stream to form a continuous catalyst phase which circulates with the flowing gas stream without departing from the scope of this invention. In the former condition in which the gaseous mixture is passed upward through the catalyst mass, the catalyst mass may be said to be suspended in the gas stream but not entrained therein in the sense that there is movement of the catalyst mass as such in the direction of flow of the gas stream. When operating with a catalyst in the pseudo-liquid condition, it is preferred to maintain the upward velocity in the gas stream sufficiently high to maintain the fluidized catalyst mass in a highly turbulent condition in which the catalyst particles circulate at a high rate within the pseudo-liquid mass, yet sufficiently low to form a so-called interface between a lower dense pseudo-liquid phase and an upper dilute phase. In this pseudo-liquid condition of operation, a small proportion of the catalyst in the fluidized mass may be entrained in the gas stream emerging from the upper surface of the dense phase whereby catalyst thus entrained is carried away from the mass. In producing normally liquid organic compounds under conditions to react all or a major proportion of the carbon monoxide reactant by employing a finely divided iron catalyst suspended in a pseudo-liquid condition in the reaction, the suitable operating conditions are approximately as follows: a pressure between about atmospheric and about 600 pounds per square inch gage, preferably a pressure above about 150 pounds, a temperature between about 350° F. and 700° F. and a space velocity equivalent to a charging rate between about 100 and 5000 standard volumes of combined or total feed gas per hour per volume of catalyst in the dense phase, preferably a space velocity above about 500 or 600.

The catalyst material to which the present invention applies is a finely divided powder comprising reduced metallic iron and may contain in addition appropriate amounts of a promoter or promoters incorporated with the iron in the manner described in the aforementioned copending application Serial No. 735,536, now Patent No. 2,543,327, or a mixture of such iron catalyst and other catalytic materials and non-catalytic materials. The catalyst may also include in combination therewith supporting materials, such as alumina, silica gel, bentonite type clay, and acid treated bentonite, for example hydrogen montmorillonite. In this specification and claims, the catalyst is described by reference to its chemical condition subsequent to its reduction and prior to pretreatment.

The catalyst is employed in a fine state of subdivision. Preferably, the powdered catalyst initially contains no more than a minor proportion by weight of material whose particle size is greater than about 250 microns. Preferably, also, the greater proportion of the catalyst mass comprises material whose particle size is smaller than about 100 microns, including at least 25 weight per cent of the material in particle sizes smaller than 40 microns. A highly fluidizable powdered catalyst comprises at least 75 per cent by weight of material smaller than 150 microns in particle size, and at least 25 per cent by weight smaller than about 40 microns in particle size.

Operations in which the above finely divided catalyst is maintained in a pseudo-liquid fluidized condition in the reaction zone results in a concentration or density of catalyst expressed as pounds per cubic foot between one quarter and three quarters of the density of the catalyst in a freely settled condition. For example, with finely divided reduced iron, the freely settled density is about 120 to about 150 pounds per cubic foot and the density of the pseudo-liquid dense phase is between about 30 and about 105 pounds per cubic foot depending upon the condition of the catalyst as to coke, wax, etc. In contrast the concentration or density of an entrained finely divided catalyst in a high velocity system, is less than about one sixth of the freely settled density of the catalyst, and for reduced iron is often about 10 or 12 pounds per cubic foot.

The dense phase operation ordinarily involves employment of catalyst powders and linear gas velocities such that a relatively small portion of the catalyst is carried away from the lower dense phase by entrainment, and it is necessary, therefore, to provide means in the reactor for separating such entrained catalyst and returning it to the dense phase, or to provide means externally of the reactor to separate entrained catalyst from the gaseous effluent and return it to the reactor, or otherwise to recover catalyst from the gaseous effluent.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The linear velocity of the gas stream passing upward through the dense phase is conveniently expressed in terms of the superficial velocity, which is the linear velocity the charge gas stream would assume if passed through the reactor in the absence of catalyst. This superficial velocity takes into account the shrinkage in volume caused by the reaction and is, preferably, in the range of from about 0.1 to about 5 or 6 feet per second. When operating with a continuous catalyst phase in which the catalyst is entrained in the flowing gaseous mixture, velocities as high as about 50 feet per second may be used. Reference may be had to my prior and co-pending application Serial No. 726,620, filed February 5, 1947, now Patent No. 2,640,844, for a more detailed discussion of velocities and other conditions characteristic of a high velocity system.

In hydrogenating carbon monoxide according to the preferred embodiment of this invention, unconverted hydrogen and/or carbon monoxide are recycled in a volume ratio of combined or total feed to fresh feed above about 1:1 to about 5:1. The recycle gas containing hydrogen, carbon monoxide, and carbon dioxide may additionally contain normally gaseous and/or normally liquid components of the reaction effluent. A conversion of carbon monoxide between about 70 and about 100 per cent has been observed when using such recycle ratios. A yield of oil between about 97 and about 126 ccs. per cubic meter of fresh feed gas and a yield of water between about 99 and about 171 ccs. per cubic meter of fresh feed gas have been obtained under the preferred operating conditions of this invention with an activated or pretreated catalyst.

The feed mixture to the reaction zone, as previously stated, comprises hydrogen and carbon monoxide in the previously indicated ratios. In most instances other gaseous ingredients are contained in the feed mixture, such ingredients comprise steam, nitrogen, methane, ethane and other saturated hydrocarbons. Since the feed gas contains such non-reactive ingredients as nitrogen, it is necessary in most instances to vent or discard a portion of the recycle gas in order to prevent a build-up of nitrogen in the system. The presence of such ingredients as methane and steam as well as excess quantities of hydrogen aids in reducing the deposition of relatively high molecular weight organic compounds and coke upon the catalyst by decreasing the partial pressure of the carbon monoxide and reaction products.

Upon extended and prolonged use of the iron catalyst in the hydrogenation of carbon monoxide, it may become necessary to regenerate or revivify the catalyst as a result of accumulation of carbonaceous deposits thereon and as a result of deactivation of the catalyst itself, although regeneration is not as frequent when the catalyst has been activated in accordance with this invention. Carbonaceous deposits are removed from the catalyst and the catalyst reactivated by treating the catalyst by the successive steps of oxidation and reduction, or reduction alone, accompanied by a subsequent activation treatment similar to that used for the starting-up procedure or pretreatment with the freshly prepared or reduced iron catalyst. Oxidation of the finely divided catalyst is conveniently carried out by the fluidized technique with an oxygen-containing gas, such as air, at the operating pressure of the synthesis reaction, or at a lower pressure, and at a temperature above about 800° F. Generally, the pressure for oxidation is approximately atmospheric. Reduction is normally carried out at substantially lower temperatures than the oxidation temperature when super-atmospheric pressures, such as above about 200 pounds per square inch gage, are used; such reduction temperatures may be as low as about 600 to about 800° F. at which sintering of the catalyst is avoided. When reduction of the catalytic material is effected at atmospheric pressures, the temperature is between about 900° F. and about 1600° F. The reducing gas preferably comprises gaseous hydrogen; however, other reducing gases, such as methane, carbon monoxide, etc., may be employed and the gas stream may include other non-reducing ingredients such as nitrogen, in amounts which do not interfere with the reducing action.

The fluidization of the catalytic material for both the oxidation and reduction operations may be brought about initially by the passage of the stream of oxidizing or reducing gas through the reactor at the initial temperature desired for effecting the reaction. It is preferred, however, to pass a stream of relatively inert gas, such as nitrogen, methane or other saturated hydrocarbon, through the reactor initially to fluidize the contact material and purge the reactor of undesirable gases. Thereafter, the introduction of a stream of the oxidizing or reducing gas, as the case may be, is initiated at the desired temperature. Alternatively, the passage of the oxidizing or reducing gas stream may be initiated at a relatively low temperature after which the temperature of the gas stream is gradually raised to the necessary oxidizing or reducing temperature. Both the oxidation and reduction treatment are preferably continued, by the passage of the treating gas through the reaction zone at a velocity effective to produce the desired fluidized condition of the finely divided contact material, until oxidation or reduction, as the case may be, is substantially complete. Completion of oxidation is indicated by the increase in oxygen content of the effluent gas and completion of reduction is indicated by the substantial absence of water in the gas stream emerging from the reduction reaction. In some instances partial reduction of the catalyst mass comprising iron is sufficient to produce the desired catalytic effect during the hydrogenation of carbon monoxide. An iron catalyst comprising less than 50 weight per cent elementary iron disregarding the presence of promoters and supports is within the scope of this invention.

After reduction of the catalytic material in order to activate that material to its maximum activity for the production of normally liquid organic compounds from hydrogen and carbon monoxide and to assure continued fluidity of the catalyst bed, the catalytic material is subjected to a treatment with a gaseous mixture of hydrogen and carbon monoxide comprising less than about 15 volume per cent carbon monoxide and a mol ratio of hydrogen to carbon monoxide of at least 5:1 for a period of time equivalent to at least 150 standard cubic feet of carbon monoxide per pound of catalyst calculated as the elementary metal. The reaction conditions, such as temperature, pressure, and space velocity, may conveniently be those conditions maintained during the synthesis reaction proper.

In regenerating and activating the catalyst which has been used in a finely divided condition for the synthesis of organic compounds by the hydrogenation of carbon monoxide, the catalyst may be continuously or intermittently withdrawn from the synthesis reaction zone and subjected to successive treatments of oxidation, and/or reduction and activation in a single or a plurality of zones. Alternatively, the entire catalyst mass in the synthesis reaction zone itself may be subjected to successive treatments of oxidation, and/or reduction and activation, which method results in an intermittent synthesis process with respect to a given reactor, whereas the former method permitted a continuous synthesis process. Both of the above methods are described in my co-pending application Serial No. 783,382, now Patent No. 2,542,422.

As used in this specification and claims, suspending the catalyst in a "fluidized condition" or by the "fluidized technique" has reference to the catalyst either when it is in the pseudo-liquid dense phase or when it is entrained and circulates in a continuous phase through the reaction zone. "Fluid-bed" refers to the pseudo-liquid dense phase type of operation. The term "regeneration" refers to the treatment of a spent or partially spent catalyst by either oxidation or reduction or both. On the other hand, activation has reference to that special treatment of the catalyst according to this invention comprising treating either a fresh or regenerated catalyst to impart to the catalyst its maximum activity for the production of normally liquid organic compounds without excessive formation of wax and relatively high molecular weight organic compounds, and to provide a method for assuring adequate and continuous fluidization of a finely divided catalyst.

The invention in various modifications will be described further by reference to the accompanying drawing which is a view in elevation, partly in cross-section, of a reactor suitable for carrying out the invention.

In such further description as well as in the prior description pressures are expressed as pounds per square inch gage and volumes of gas as (standard) cubic feet measured at 70° F. and atmospheric pressure.

Reactor 11 consists of a length of extra heavy standard 2-inch steel pipe which is about 153 inches long and has inside and outside diameters of 1.94 inches and 2.38 inches, respectively. Reactor 11 is connected, by conical section 12, to an inlet pipe 13 made of extra heavy standard half-inch steel pipe having an inside diameter of 0.55 inch. Reactor 11 is connected at the top, by means of conical section 14, with an enlarged conduit 15 comprising a length of 6-inch extra heavy standard steel pipe having an inside diameter of 5.76 inches. Conical section 14 and conduit 15 constitute an enlarged extension of reactor 11 which facilitates disengagement of catalyst from the gas stream after passage of the latter through a dense catalyst phase.

Conduit 15 is connected by means of manifold 16 with conduits 17 and 18 which comprise other sections of extra heavy 6-inch standard steel pipe. Conduits 17 and 18 contain filters 19 and 20 which are constructed of porous ceramic material which is permeable to the gas and vapors emerging from the reaction zone but impermeable to the catalyst particles carried by entrainment in the gas stream. Filters 19 and 20 are cylindrical in shape and closed at the bottom ends. They are dimensioned in relation to conduits 17 and 18 to provide a substantial annular space between the filter and the inner wall of the enclosing conduit for the passage of gases and vapors and entrained catalyst upwardly about the outer surface of the filter. The upper ends of filters 19 and 20 are mounted in closure means 21 and 22 in a manner whereby the gases and vapors must pass through either filter 19 or filter 20 to reach exit pipes 23 and 24. Each of filters 19 and 20 is approximately 36 inches long and 4½ inches in outside diameter, the ceramic filter walls being approximately ¾ of an inch thick.

The greater part of reactor 11 is enclosed in a jacket 25 which extends from a point near the top of the reactor to a point sufficiently low to enclose the 3 inch length of conical section 12 and approximately 5 inches of pipe 13. Jacket 25 comprises a length of extra heavy 4-inch standard steel pipe having an inside diameter of 3.83 inches. The ends of jacket 25 are formed by closing the ends of the 4-inch pipe in any suitable manner, as shown, and sealed by welding. Access to the interior of jacket 25 is provided by an opening 29 in the top thereof through a 2-inch steel pipe. Jacket 25 is adapted to contain a body of liquid for temperature control purposes, such as water, or "Dowtherm" (diphenyl or diphenyl oxide or a mixture of same). The vapors which are evolved by the heat of reaction in reactor 11 are withdrawn through conduit 26, condensed by means not shown, and returned through conduit 26 to the body of temperature control fluid in jacket 25. Electrical heating means (not shown) is provided in connection with jacket 25 to heat the temperature control fluid therein to any desired temperature, for use particularly when starting up the hydrogenation reaction.

In order to show all the essential parts of the reactor and associated catalyst separation means on a single sheet a large proportion of the apparatus has been eliminated by the breaks at 27 and 28. For a clear understanding of the relative proportions of the apparatus reference may be had to the overall length of the apparatus, from the bottom of jacket 25 to exit pipes 23 and 24, which is about 224 inches. In each of breaks 27 and 28 the portion of the apparatus eliminated is identical with that portion shown immediately above and below each break.

In the operations carried out in the apparatus of the drawing, the catalyst recovery means comprising filters 19 and 20 is effective to separate substantially completely entrained catalyst from the outgoing stream of gases and vapors. The disengagement of solids from the gas stream is promoted by the lowered velocity of the gas stream in conduit 15 and remaining solids are separated on the outer surfaces of filters 19 and 20. The latter are employed alternately during the operation so that the stream of gases and vapors and entrained solids passes from conduit 15 through either the left or right branches of manifold 16 into either conduit 17 or conduit 18. During the alternate periods the filter which is not in use is subjected to a back pressure of gas which is introduced at a rate sufficient to dislodge catalyst which has accumulated on the outer surface of the filter during the active period. Such "blowback" gas and dislodged catalyst flow downwardly in the conduit enclosing the filter and into manifold 16 in which the "blowback" gas is combined with the reaction mixture flowing upwardly from conduit 15. The greater part of the catalyst thus dislodged settles downwardly into the reactor and is thus returned for further use. The "blowback" gas conveniently comprises recycle gas, such as from conduit 41.

In the operation of the apparatus of the drawing the desired quantity of powdered catalyst is introduced directly into the reactor through a suitable connection, not shown, in conduit 15. After any desired preliminary activation treatment, the temperature of the fluid in jacket 25 is adjusted when necessary, by heating or cooling means and by the pressure control means, to the temperature desired to be maintained in jacket 25 during the reaction. After the catalyst mass has reached the desired reaction temperature, which may be the same or higher or lower than the activation temperature, the introduction of the reaction mixture through pipe 13 is initiated. The reaction mixture may be preheated by means not shown approximately to the reaction temperature prior to its introduction through pipe 13 or the reactants may be heated to the reaction temperature through the passage thereof through that portion of pipe 13 which is enclosed by jacket 25 and by contact with the hot catalyst. It will be understood, furthermore, that the enclosure of pipe 13 in jacket 25 is not necessary to the invention and that the reactants may be heated to the reaction temperature solely by contact with hot catalyst. Generally, reactor 11 is maintained at a superatmospheric pressure during both activation and hydrogenation.

Pipe 13 is dimensioned with respect to reactor 11 and the desired superficial velocity whereby the linear velocity of the gases passing through pipe 13 is sufficiently high to prevent the passage of solids downwardly into pipe 13 against the incoming gas stream. A ball check valve, not shown, is provided to prevent solids from passing downwardly out of the reactor when the gas stream is not being introduced into pipe 13.

The reaction effluent from reactor 11 is removed therefrom through either or both conduits 23 and 24 and passed by means of conduit 31 to a primary condensation unit 32. Condensation unit 32 comprises a jacketed accumulator in which steam is passed around the accumulator through a jacket to cool the reaction effluent to a temperature of about 300° F. at the operating pressure existing in reactor 11. Cooling of the reaction effluent at the operating pressure to about 300° F. condenses the relatively high molecular weight organic compounds and waxes which are removed from the condensation unit 32 through conduit 33. Uncondensing vapors are removed from condensation unit 32 and passed through a condenser 36 to accumulator 37. Condenser 36 cools the reaction effluent to a temperature below about 100° F. and results in the accumulation of two liquid phases in accumulator 37. The two liquid phases formed in accumulator 37 comprise a heavy water-rich phase containing dissolved oxygenated organic compounds and a lighter hydrocarbon-rich phase which also may contain some oxygenated organic compounds having more than four carbon atoms per molecule. The two liquid phases are withdrawn from accumulator 37 through conduit 38 for subsequent recovery and purification by conventional means not shown, such as by distillation and extraction. Uncondensed components of the reaction effluent comprising unreacted hydrogen and/or carbon monoxide, methane and carbon dioxide are removed from accumulator 37 through conduit 39. These gases may be vented to the atmosphere, if desired, or may be recycled through conduit 41 to inlet conduit 13 of reactor 11 to supplement the feed thereto and to alter the ratio of hydrogen to carbon monoxide in reactor 11. The presence of methane, excess hydrogen and diluents in the recycle stream serves to strip the relatively heavy organic compounds and waxes from the catalyst particles in reactor 11 and is thus an aid in preventing settling of the fluid-bed of catalyst.

The following examples are illustrative of the procedure for starting-up a process for the hydrogenation of carbon monoxide with a freshly reduced catalyst comprising iron. Since the examples are illustrative only of the starting-up procedure and in some cases the actual operating conditions for producing the desired product, they should not be considered unnecessarily limiting and are offered merely as better understanding of the improved process of the present invention.

Runs illustrated in the Examples I and II were carried out in apparatus substantially the same as that shown in the drawing. The run of Example III was carried out in a pilot plant using a high velocity reactor in which the catalyst is entrained in the gas stream and recycled. The results of each operating run are reported in conventional tabular form. The yield of condensed oil, wax and oxygenated compounds represents the product in the primary receiver at about 300° F. and at operating pressure and in the secondary receiver at about 70° F. and operating pressure including the oxygenated chemicals in the condensed water.

The break-down of the reaction products showing the distribution of particular products obtained by CO conversion is an indication of the selectivity of the catalyst.

EXAMPLE I

Catalyst for use in this operation was prepared by suitable treatment of a mixture of iron oxide and titania and potassium oxide, previously prepared by fusion of the titania and potassium hydroxide in molten iron oxide, for used in catalyzing ammonia synthesis. The material consisted principally of iron oxides and contained about 0.9 per cent alumina, 0.9 per cent potassium oxide, 0.8 per cent silica, 0.4 per cent titania and about 97 per cent iron oxides. It was first ground to below 30 mesh size and then pelleted. The pelleted material was then reduced in a stream of hydrogen.

In the reduction treatment, a heated stream of hydrogen was passed through the granular mass, treated by heat exchange with tap water to remove most of the water formed by the reduction reaction, and then recirculated. Reduction was initiated at about 700° F. under atmospheric pressure. The temperature of the catalyst mass was then raised to about 1350° F. in four hours, while continuing the flow of the hydrogen stream. This condition was maintained for two hours longer, during which time the reduction was substantially completed, as evidenced by the practical cessation of water formation. The reduced mass was then cooled to room temperature in the hydrogen atmosphere. Partial reduction of the catalyst, for example where only about 50 per cent or less of the iron oxides are reduced to Fe, is within the scope of this invention; however, substantially complete reduction is preferred.

After the reduction the catalyst was ball-milled to the desired degree of fineness. Throughout this period the catalyst was not permitted to come in contact with air, the grinding operations being conducted in an atmosphere of $CO_2$. The catalyst powder contained about 95 weight per cent iron (Fe) and about 1.2 weight per cent potassium calculated as the oxide.

About 17 pounds of the catalyst thus prepared were charged into reactor 11 through an inlet (not shown) in section 15 of the drawing. During this operation the catalyst was maintained in the atmosphere of carbon dioxide and a small stream of 1 to 2 cubic feet per hour of carbon dioxide was passed upwardly through reactor 11 to prevent packing of the catalyst. After the catalyst was charged to the reactor the carbon dioxide stream was replaced with a stream of hydrogen which was passed upwardly through reactor 11 at the rate of 10 to 20 cubic feet per hour. The hydrogen flow rate was increased to 50 cubic feet per hour and the temperature was then raised to about 450° F. by means of the heating coils around jacket 25. The above flow rate is equivalent to a superficial linear velocity of about 1.3 feet per second in reactor 11 which produces a pseudo-liquid dense phase of fresh catalyst. The outlet pressure on the reactor was then raised to about 80 pounds per square inch gage.

After reactor 11 had reached a temperature of about 465° F., approximately 150 cubic feet per hour of fresh synthesis feed gas having a mol ratio of hydrogen to carbon monoxide greater than about 3:1 was substituted for hydrogen and passed through reactor 11.

The method of activation employed and activation conditions are shown in Table I below:

Table I

| Total Hours | Operating Press., p. s. i. g. | Max. Cat. Temp., °F. | S. c. f. CO/Hr./Lb. Fe | Inlet Vel. F. P. S. | Percent CO in Inlet Gas [1] |
|---|---|---|---|---|---|
| 10 | 80 | 465 | | 1.7 | 14.3 |
| 25 | 80 | 595 | 3 | 2 | 10.3 |
| 50 | 80 | 595 | 1.5 | 1.9 | 6.5 |
| 75 | 125 | 595 | 1.5 | 1.6 | 5.0 |
| 100 | 180 | 595 | 2 | 1.5 | 4.7 |
| 150 | 250 | 600 | 2 | 1.5 | 8.5 |
| 200 | 250 | 605 | 2 | 1.7 | 8.5 |

[1] Inlet gas=fresh feed plus recycle gas.

The following results were obtained during the 48 hours just prior to 202 hours of operation, and are shown in Table II.

Table II

Operating conditions:
    Pressure—p. s. i. g. _____ 250
    Temperature—° F. _____ 595
    Fresh feed gas—mol per cent:
        $CO_2$ _____ 4.0
        CO _____ 25.5
        $H_2$ _____ 69.8
        Residue _____ 0.7

Total _____ 100.0

Table II—Continued

Combined inlet gas analysis—mol per cent:
| | |
|---|---|
| $CO_2$ | 8.2 |
| CO | 8.5 |
| $H_2$ | 56.1 |
| Hydrocarbons, etc | 27.2 |
| Total | 100.0 |
| Recycle ratio | 9.2 |
| Linear velocity—F. P. S. | 1.6 |
| Catalyst density—P. C. F. | 73 |

Results—per cent:
| | |
|---|---|
| $CO \rightarrow CO_2$ | —9.2 |
| $CO \rightarrow CH_4$ | 11.5 |
| $CO \rightarrow C_2$ | 7.4 |
| $CO \rightarrow C_3$'s | 9.1 |
| $CO \rightarrow C_4$'s | 3.8 |
| $CO \rightarrow C_5$+light naphtha | 6.4 |
| $CO \rightarrow$ Condensed oil, wax and oxygenated compounds | 39.0 |
| $CO \rightarrow$ Unconverted, loss, etc. | 32.0 |

After 50 hours of operation the catalyst of Example I contained 3.5 pounds of carbon per 100 pounds of catalyst. After 200 hours of operation it contained 6.5 pounds of carbon per 100 pounds of catalyst.

EXAMPLE II

Catalyst for use in this operation was prepared by suitable treatment of a mixture of iron oxide and alumina and potassium carbonate, previously prepared by fusion of the alumina and potassium carbonate in molten iron oxide. This material consisted principally of iron oxides and contained about 2.0 per cent alumina, 1.5 per cent potassium oxide, 0.6 per cent silica, 0.8 per cent titania and about 95 per cent iron oxides. It was first ground to a particle size finer than 30 mesh and then pelleted. The pelleted material was then reduced in a stream of hydrogen.

In the reduction treatment a heated stream of hydrogen was passed through the granular mass, treated by heat exchange with tap water to remove most of the water formed by the reduction reaction, and then recirculated. Reduction was initiated at about 700° F. The temperature of the catalyst mass was then raised to about 1350° F. in four hours, while continuing the flow of the hydrogen stream. This condition was maintained for two hours longer, during which time the reduction was substantially completed, as evidenced by the practical cessation of water formation. The reduced mass was then cooled to room temperature in the hydrogen atmosphere.

After the reduction the catalyst was ball-milled to the desired degree of fineness. Throughout this period the catalyst was not permitted to come in contact with air, the grinding operations being conducted in an atmosphere of $CO_2$. The catalyst powder contained about 94 weight per cent iron (Fe) and about 1.9 per cent potassium calculated as the oxide.

About 20 pounds of the catalyst thus prepared were charged into reactor 11 through an inlet (not shown) in section 15 of the drawing. During this operation the catalyst was maintained in an atmosphere of carbon dioxide and a small stream of 1 to 2 cubic feet per hour of carbon dioxide was passed upward through reactor 11 to prevent packing of the catalyst. After the catalyst was charged to the reactor, the carbon dioxide stream was replaced with a stream of hydrogen which was passed upward through reactor 11 at the rate of 10 to 20 cubic feet per hour. The hydrogen flow rate was increased to 50 cubic feet per hour and the temperature was then raised to about 350° F. by means of the heating coils around jacket 25. The outlet pressure on the reactor was then raised to about 80 pounds per square inch gage.

The following tabulation shows the method of activation employed.

Table III

| Total Hours | Operating Press., p. s. i. g. | Max. Cat. Temp., °F. | S. c. f. CO/Hr./ Lb. Fe | Inlet Vel. F. P. S. | Percent CO in Inlet Gas [1] |
|---|---|---|---|---|---|
| 2 | 80 | 382 | 3.0 | | |
| 8 | 80 | 688 | 3.2 | | 14 |
| 14 | 80 | 683 | 3.06 | | 14 |
| 20 | 80 | 678 | 3.12 | 2–2.5 | 14 |
| 26 | 80 | 678 | 3.20 | 2–2.5 | 14 |
| 32 | 80 | 684 | 3.17 | 2–2.5 | 14 |
| 38 | 80 | 686 | 3.20 | 2–2.5 | 14 |
| 44 | 80–150 | 691 | 3.46 | 2–2.5 | 8 |
| 50 | 150 | 633 | 3.29 | 2–2.5 | 8 |
| 56 | 150 | 628 | 3.31 | 2–2.5 | 8 |
| 62 | 150 | 644 | 3.36 | 2–2.5 | 8 |
| 68 | 165–250 | 633 | 4.60 | 2–2.5 | 7 |
| 74 | 250 | 626 | 4.48 | 2–2.5 | 7 |
| 80 | 250 | 615 | 4.54 | 2–2.5 | 7 |
| 86 | 250 | 618 | 4.51 | 2–2.5 | 7 |
| 92 | 250 | 623 | 4.40 | 2–2.5 | 7 |
| 98 | 250 | 629 | 4.45 | 2–2.5 | 7 |
| 104 | 250 | 630 | 4.56 | 2–2.5 | 7 |
| 110 | 250 | 626 | | 2–2.5 | 7 |
| 116 | 250 | 633 | | 1.7 | 14 |
| 122 | 250 | 632 | | 1.7 | 14 |
| 128 | 250 | 646 | | 1.7 | 14 |
| 134 | 250 | 625 | | 1.7 | 14 |

[1] Inlet gas=fresh feed plus recycle gas.

The following results were obtained during the 24 hours just prior to 134 hours of operation.

Table IV

Operating conditions:
| | |
|---|---|
| Pressure—p. s. i. g | 250 |
| Temperature—° F | 615 |

Fresh feed gas—mol per cent:
| | |
|---|---|
| $CO_2$ | 8.6 |
| CO | 31.7 |
| $H_2$ | 56.9 |
| Residue | 2.8 |
| Total | 100.0 |

Combined inlet gas—mol per cent:
| | |
|---|---|
| $CO_2$ | 29.7 |
| CO | 14.4 |
| $H_2$ | 31.7 |
| Hydrocarbons, etc | 24.2 |
| Total | 100.0 |
| Recycle ratio | 3.8 |
| Linear velocity—F. P. S | 1.7 |

Results—per cent:
| | |
|---|---|
| $CO \rightarrow CO_2$ | 2.2 |
| $CO \rightarrow CH_4$ | 8.3 |
| $CO \rightarrow C_2$'s | 7.2 |
| $CO \rightarrow C_3$'s | 7.0 |
| $CO \rightarrow C_4$'s | 4.9 |
| $CO \rightarrow C_5$+light naphtha | 6.9 |
| $CO \rightarrow$ Condensed oil, wax and oxygenated compounds | 52.8 |
| $CO \rightarrow$ Unconverted, loss, etc | 10.7 |

After 40, 65 and 90 hours of operation the catalyst contained 20.4 per cent, 24.8 and 25.6 per cent carbon, respectively. In other words, the carbon formation increased very rapidly at first and thereafter the rate of increase was order of magnitude lower. The carbon content of the catalyst reported in Examples I and II includes carbon in any form whatsoever, such as, carbidic carbon, graphitic carbon, carbonaceous deposits, coke, etc.

The carbon monoxide content of the activation gas in Examples I and II was somewhat above the preferred value when starting the activation process since the composition of the gas was limited by its source and the lack of extraneous hydrogen. After a portion of the carbon monoxide content had been depleted by the reaction, the excess hydrogen in the recycle gas lowered the inlet carbon monoxide concentration. The initial period of the activation treatment was primarily for the purpose of obtaining the desired carbon monoxide concentration in the inlet gas, such as below about 10 per cent, and after this initial period the pressure was raised to 150 or 250 pounds per square inch gage.

EXAMPLE III

Catalyst for use in this operation was prepared by suitable treatment of a mixture of iron oxide and potassium carbonate previously prepared by fusion of the potassium carbonate in molten iron oxide. This material consisted principally of iron oxides and contained about 0.9 per cent alumina, 0.45 per cent potassium oxide, 0.8 per cent silica, 0.5 per cent titania and the remainder iron oxides. The fusion took place in an electric arc furnace which was operated continuously. Lumps of fused material some 2 or 3 inches in diameter were charged to a jaw crusher and broken to a size finer than 8 mesh. This material was subsequently placed in a ball mill with quartzite balls and milled sufficiently such that 95 per cent of the powder passed a 40 mesh screen. 50 per cent of the resulting powder was finer than 200 mesh.

The catalyst was then charged in an unreduced condition to a fluid catalyst pilot plant which contained both a reactor and a standpipe. The catalyst flowed upward through the reactor with the gas stream and discharged into a low velocity section where the bulk of the catalyst settled out and fell downward into the standpipe from whence it was picked up at the base of the standpipe by the incoming gas stream and passed once again into the reaction zone. The catalyst was reduced in the fluid catalyst synthesis pilot plant reactor with hydrogen at a pressure of 250 pounds per square inch gage and a temperature of about 650° F. This catalyst contained about 0.6 per cent $K_2O$. The following method of activation was employed.

Table V

| Total Hours | Operating Press., p.s.i.g. | Max. Cat. Temp., °F. | S. c. f. CO/Hr./Lb. Fe [1] | Percent CO in Inlet Gas [2] | Inlet Vel., F. P. S. |
|---|---|---|---|---|---|
| 6 | 80 | 764 | 3.1 | 3.2 | 5-6 |
| 12 | 80 | 675 | 4.8 | 3.9 | 5-6 |
| 18 | 80 | 687 | 7.1 | 5.4 | 5-6 |
| 24 | 80 | 681 | 12.0 | 7.8 | 5-6 |
| 30 | 80 | 672 | 9.2 | 8.1 | 5-6 |
| 36 | 80-120 | 640 | 21.0 | 7.2 | 5-6 |
| 42 | 120 | 634 | 30.0 | 8.4 | 5-6 |
| 48 | 120 | 700 | 17.0 | 8.7 | 5-6 |
| 54 | 120 | 623 | 16.1 | 9.5 | 5-6 |
| 60 | 120 | 630 | 15.0 | 10.3 | 5-6 |
| 66 | 120-150 | 625 | 14.8 | 9.3 | 5-6 |
| 72 | 150 | 613 | 17.1 | 8.6 | 5-6 |
| 78 | 150 | 612 | 14.8 | 8.2 | 5-6 |
| 84 | 150 | 619 | 15.1 | 8.5 | 5-6 |
| 90 | 150 | 620 | 13.2 | 7.8 | 5-6 |
| 96 | 150-250 | 626 | 17.8 | 7.8 | 5-6 |
| 102 | 250 | 635 | 16.2 | 6.9 | 5-6 |
| 108 | 250 | 681 | 16.6 | 6.9 | 5-6 |
| 114 | 250 | 665 | 17.1 | 6.9 | 5-6 |
| 120 | 250 | 620 | 13.9 | 6.8 | 5-6 |

[1] Based on catlyst in high velocity reactor section (5-7 pounds) excluding circulating catalyst in standpipe, etc. (40-50 pounds).
[2] Inlet gas=fresh feed plus recycle gas.

After the first 24 hours of activation the iron in the catalyst had been converted almost completely to iron carbide.

After activation, gaseous mixtures of hydrogen and containing 15, 20 and 25 per cent carbon monoxide, respectively, was contacted with the catalyst in a fluidized condition under hydrogenation conditions without agglomeration of the catalyst particles. The mol ratio of hydrogen to carbon monoxide ranged between about 2:1 and about 4:1. In all instances, at least 65 per cent of the carbon monoxide was converted and at least 40 per cent of the carbon monoxide was converted to condensed oil, wax and oxygenated compounds.

Various modifications of the apparatus and method of operation within the general teachings of this invention will become apparent to those skilled in the art without departing from the scope of this invention.

I claim:

1. The starting-up procedure for the hydrogenation of carbon monoxide to produce normally liquid organic compounds in the presence of a fluidized finely divided contact material comprising freshly prepared and reduced elementary iron, which comprises initially contacting said contact material with a gaseous mixture containing hydrogen and between about 5 and about 10 volume per cent carbon monoxide at a temperature between about 590° F. and about 700° F., at a pressure between about atmospheric and about 600 pounds per square inch gage and at a space velocity between about 100 and about 5000 v./hr./v.

2. In a process for the hydrogenation of a carbon oxide by the fluidized technique in the presence of a contact material comprising iron at hydrogenation conditions of a tempearture between about 350 and about 700° F., a pressure between about 150 and 600 pounds per square inch gage and a space velocity between about 100 and 5000 v./hr./v., the improvement which comprises initally contacting a freshly prepared and reduced elementary iron contact material with a gaseous mixture containing hydrogen and between about 5 and about 10 volume per cent carbon monoxide having a mol ratio of hydrogen to carbon monoxide of at least 5:1 under the above hydrogenation conditions at a temperature between about 590° F. and about 700° F. for a period of time equivalent to at least 300 standard cubic feet of carbon monoxide per pound of iron calculated as the elementary metal.

3. The process of claim 2 in which the contact material comprises a relatively high alkali iron catalyst.

4. The process of claim 2 in which the fluidized technique is a fluid bed type of operation.

5. In a process for the hydrogenation of a carbon oxide by the fluidized technique in the presence of a contact material comprising iron at hydrogenation conditions, the improvement which comprises contacting a freshly prepared and reduced elementary iron contact material with a gaseous mixture containing hydrogen and between about 5 and about 10 volume per cent carbon monoxide having a mol ratio of hydrogen to carbon monoxide of at least 5:1 at a temperature between about 590° F. and about 700° F. and at a pressure between about atmospheric and about 600 pounds per square inch gage.

6. An improved method for preparing an active iron catalyst which comprises reducing a ferruginous compound containing oxygen with a gas consisting of hydrogen at an elevated temperature, and contacting reduced ferruginous material containing elementary iron with a gaseous mixture containing hydrogen and between about 5 and about 10 volume per cent carbon monoxide at a temperature between about 590° F. and about 700° F. for a period of time equivalent to at least 150 standard cubic feet of carbon monoxide per pound of iron calculated as the elementary metal.

7. In a process for the hydrogenation of a carbon oxide by the fluidized technique in the presence of a finely-divided contact material comprising iron under hydrogenation conditions such that normally liquid organic compounds are produced as products of the process, the method for activating freshly reduced contact material for use in said process which comprises contacting the freshly reduced contact material with a gaseous mixture containing hydrogen and a relatively small concentration of carbon monoxide of not lower than about 5 and less than about 10 volume per cent at a temperature between about 590° F. and about 700° F. for a period of time equivalent to at least 150 standard cubic feet of carbon monoxide per pound of iron effective to activate said contact material and to minimize its tendency to defluidize during the hydrogenation process proper, and subsequently employing said activated contact material in said process for the hydrogenation of carbon oxide under hydrogenation conditions including a relatively higher percentage of carbon monoxide in the reactant gases than employed in said activation step.

8. In a process for the hydrogenation of a carbon oxide by the fluidized technique in the presence of a finely-divided contact material consisting essentially of iron under hydrogenation conditions of a temperature between about 350 and about 700° F., a pressure between about 150 and about 600 pounds per square inch gage, a space velocity between about 100 and about 5000 v./hr./v. and the concentration of carbon monoxide in the reactant gases of at least 15 volume per cent, the method for activating freshly reduced contact material which comprises contacting freshly reduced contact material consisting essentially of iron with a gaseous mixture containing hydrogen and a relative small concentration of carbon monoxide between about 5 and about 10 volume per cent at a temperature between about 590° F. and about 700° F. for a period of time equivalent to at least 150 standard cubic feet of carbon monoxide per pound of iron effective to activate said freshly reduced contact material and to minimize its tendency to defluidize during the hydrogenation process proper, and subsequently employing said activated contact material in said process for the hydrogenation of carbon oxide under the hydrogenation conditions thereof.

9. In a process for the hydrogenation of a carbon oxide by the fluidized technique in the presence of a finely divided contact material comprising iron under hydrogenation conditions such that normally liquid organic compounds are produced as products of the process, the method for activating freshly reduced contact material for use in said process which comprises contacting the freshly reduced contact material with a gaseous mixture containing hydrogen and a relatively small concentration of carbon monoxide of less than about 15 volume per cent at a temperature between about 350° F. and about 750° F. for a period of time equivalent to at least 150 standard cubic feet of carbon monoxide per pound of iron effective to activate said contact material and to minimize its tendency to defluidize during the hydrogenation process proper, and subsequently employing said activated contact material in said process for the hydrogenation of carbon oxide under hydrogenation conditions including a relatively higher percentage of carbon monoxide in the reactant gases than employed in said activation step.

10. In a process for the hydrogenation of a carbon oxide by the fluidized technique in the presence of a finely divided contact material comprising iron under hydrogenation conditions such that normally liquid organic compounds are produced as products of the process, the method for activating freshly reduced contact material for use in said process which comprises contacting the freshly reduced contact material with a gaseous mixture containing hydrogen and a relatively small concentration of carbon monoxide of less than about 15 volume per cent at a temperature between about 590° F. and about 700° F. for a period of time equivalent to at least 150 standard cubic feet of carbon monoxide per pound of iron effective to activate said contact material and to minimize its tendency to defluidize during the hydrogenation process proper, and subsequently employing said activated contact material in said process for the hydrogenation of carbon oxide under hydrogenation conditions including a relatively higher percentage of carbon monoxide in the reactant gases than employed in said activation step.

HENRY G. McGRATH.

References Cited in the file of this patent

UNITED STATES PATENTS

| Number | Name | Date |
|---|---|---|
| 2,234,246 | Groombridge | Mar. 11, 1941 |
| 2,251,554 | Sabel et al. | Aug. 5, 1941 |
| 2,445,796 | Millendorf | July 27, 1948 |
| 2,447,505 | Johnson | Aug. 24, 1948 |
| 2,451,879 | Scharmann | Oct. 19, 1948 |
| 2,461,570 | Roberts | Feb. 15, 1949 |
| 2,527,846 | Phinney et al. | Oct. 31, 1950 |
| 2,532,621 | Hogan | Dec. 5, 1950 |